(12) United States Patent
Handerek et al.

(10) Patent No.: US 7,170,688 B2
(45) Date of Patent: Jan. 30, 2007

(54) RETROREFLECTIVE DEVICE COMPRISING GRADIENT INDEX LENSES

(75) Inventors: Vincent Andrei Handerek, Grays (GB); Leslie Charles Laycock, High Ongar (GB)

(73) Assignee: BAE Systems PLC, London (GB)

( * ) Notice: Subject to any disclaimer, the term of this patent is extended or adjusted under 35 U.S.C. 154(b) by 75 days.

(21) Appl. No.: 10/516,370

(22) PCT Filed: Aug. 27, 2004

(86) PCT No.: PCT/GB2004/003652

§ 371 (c)(1),
(2), (4) Date: Dec. 1, 2004

(87) PCT Pub. No.: WO2005/022210

PCT Pub. Date: Mar. 10, 2005

(65) Prior Publication Data

US 2006/0109561 A1    May 25, 2006

(30) Foreign Application Priority Data

Aug. 29, 2003  (EP)  .................. 03255421
Aug. 29, 2003  (GB)  .................. 0320285.0

(51) Int. Cl.
*G02B 3/00* (2006.01)
*G02B 17/00* (2006.01)

(52) U.S. Cl. .............. 359/652; 359/727; 359/732
(58) Field of Classification Search ........ 359/652–654, 359/529–533
See application file for complete search history.

(56) References Cited

U.S. PATENT DOCUMENTS

| 2,866,971 | A |   | 12/1958 | Kelleher |
| 4,789,219 | A |   | 12/1988 | Layne |
| 4,848,882 | A | * | 7/1989 | Suzuki et al. ............... 359/652 |
| 6,288,842 | B1 |  | 9/2001 | Florczak |
| 6,461,718 | B2 | * | 10/2002 | Mori ........................... 428/143 |
| 2004/0212882 | A1 | * | 10/2004 | Liang et al. ................ 359/462 |

FOREIGN PATENT DOCUMENTS

| DE | 1 252 856 | 10/1967 |
| GB | 1 477 175 | 6/1977 |
| WO | WO 97/23423 | 7/1997 |
| WO | WO 97/23788 | 7/1997 |

OTHER PUBLICATIONS

Spherical gradient-index polymer lens with spherical aberration, Yasuhiro Koike et al., Applied Optics, vol. 33, No. 16, Jun. 1, 1994, pp. 3394-3400.
IPER dated Sep. 13, 2005 re PCT/GB2004/003652.

* cited by examiner

*Primary Examiner*—Jordan M. Schwartz
(74) *Attorney, Agent, or Firm*—Buchanan Ingersoll and Rooney PC

(57) ABSTRACT

A retroreflective device comprising a substantially spherical graded refractive index lens, referred to as a GRIN-sphere lens (2), a reflective part for retroreflecting (6) a radiation beam (B) passing through the graded refractive index lens and, at least partially surrounding the lens, a transparent material (4) having a substantially uniform refractive index.

16 Claims, 5 Drawing Sheets

RETROREFLECTIVE DEVICE COMPRISING GRADIENT INDEX LENSES

FIELD

This invention relates to retroreflective devices; the term "retroreflective devices" as used herein being intended to encompass generally optical components used for returning radiation automatically from a remote location toward an optical source.

BACKGROUND

Retroreflective devices are designed to reflect radiation back towards its source, and such devices are thus frequently used to return radiation toward radiating optical sources when it is inconvenient or undesirable to actively generate radiation at locations, remote from the optical sources, which need to send response radiation to fixed or mobile base locations at which the radiating optical sources are sited. Common examples include the use of special reflective materials for safety clothing or signage, cat's eye markers in road surfaces, and measurement points in land surveying or robotic machinery. Retroreflective devices may also be used in combination with optical modulation mechanisms in order to establish two-way optical communication between the base station and the remote location without needing an optical source at the remote end of the link.

Retroreflective devices currently in common use can be classified into two main types.

The first of these accomplishes retroreflection without any focusing of the incoming radiation from the source. This type is commonly available as a component with a set of three mutually perpendicular reflecting surfaces, and is known as a "corner-cube" retroreflector. Different embodiments of this type of reflector exist, but all require very high quality in the reflecting surfaces, which also need to be very accurately assembled in order to provide precise angular coincidence between the incident and reflected beams. Consequently, such components are expensive to make, but they have the advantage of providing diffraction limited performance which gives excellent quality to the reflected beam. Disadvantageously, however, such devices exhibit a limited field of view which varies with the construction details, but which cannot allow coverage of arbitrary angles of incidence across a full hemisphere without grouping several reflectors together, where each reflector is pointed in a different direction. This increases the expense and the complexity of constructing such devices with high field of view.

The second type of retroreflective device currently in common use employs focusing of the incident radiation onto a primary reflecting surface. This type is known as a "cat's eye" retroreflector, and commonly employs glass spheres, or cemented hemispheres, in order to provide retroreflection for paraxial incident rays. Such devices can be made very small (for example with sub-millimeter diameters) and offer a very wide field of view, including a complete hemisphere or more in a single component. Furthermore, single spheres can be manufactured in quantity at low cost. The main disadvantage of this design is that the reflected radiation is subject to severe spherical aberration for non-paraxial rays, and this can strongly reduce the far-field intensity of the reflected beam measured on-axis. It also leads to significant beam divergence, making the reflection visible far from the axis, which can be undesirable in some applications, for example in free-space communication where privacy is desired.

A class of lenses, called 'graded refractive index' (or GRIN) lenses, is known, in which the material of the lens exhibits gradual variations in refractive index through its volume. An example is the so-called "GRIN-rod" lens, which is a graded-index lens with cylindrical symmetry and radial parabolic index distribution. See S. Nemoto and J. Kida, 'Retroreflector using gradient-index rods' Appl. Opt. 30(7), 1 Mar. 1991, p. 815–822.

In a publication entitled "Gradient Index Optics" published by Academic Press in 1978, E. W. Marchand describes at pages 2 and 3 a lens, previously discovered by Luneburg, having an index function with spherical symmetry about a point. Marchand describes the Luneburg lens as difficult to make (at least for radiation in the visible region of the spectrum), and goes on to say that the lens, even if it can be made, has limited possibilities for useful application, though he does suggest a possible modification of the lens, incorporating a mirror to produce an action similar to that of a corner cube.

Sphere lenses with refractive index distributions possessing spherical symmetry are known as 'GRIN-sphere' lenses, having a spherically symmetric refractive index distribution in which the refractive index varies gradually across a radial cross-section. Such lenses are known to exhibit improved spherical aberration compared to uniform sphere lenses. See Y. Koike, A. Kanemitsu, Y. Shioda, E. Nihei and Y. Ohtsuka, 'Spherical gradient-index polymer lens with low spherical aberration' Appl. Opt. 33(17), 1 Jun. 1994, p. 3394–3400.

GRIN-rod lenses have been proposed for use in retroreflective devices, but these lenses suffer from restrictions on field of view similar to those exhibited by corner-cube retroreflectors. Other types of cat's eye retroreflector can be based on catadioptric lens designs, but these also share the aforementioned restrictions on field of view.

BRIEF SUMMARY

The present invention aims to address at least one of the above-identified disadvantages associated with the retroreflective devices currently in common use. Preferred embodiments of the invention aim to overcome, or at least reduce, the spherical aberration experienced in cat's eye retroreflectors based on conventional sphere lenses while retaining, at least in substantial measure, their benefits of wide field of view compared to corner-cube retroreflectors.

According to one aspect of the invention there is provided a retroreflective device comprising a substantially spherical graded refractive index lens, a reflective part for retroreflecting a radiation beam passing through the graded refractive index lens and, at least partially surrounding the lens, a non-gaseous transparent material having a substantially uniform refractive index.

The provision of a transparent material of substantially uniform refractive index outside the lens provides for increased ease of manufacture of the device when the refractive index of the refractive material is substantially greater than unity. The GRIN-sphere lens can then have a refractive index variation which need not be as large as would otherwise be required. Further, by use of the present invention, the refractive index at the outer surface of the lens need not be matched to that of an air interface, which is practically impossible, particularly in the visible and infrared regions of the spectrum, in which the present invention has particular application.

Preferably, the refractive index distribution of the GRIN-sphere lens has a spherical aberration reducing effect. The invention may be employed where the focusing action of a low-aberration sphere in air is not strong enough to provide convergence of the incident beam to a point on the rear surface of the sphere itself, or if sufficiently low aberration for a particular application cannot be achieved using a GRIN-sphere in air.

In preferred embodiments, the transparent material surrounds a substantial part of the lens. In a particularly preferred embodiment, the transparent material surrounds at least approximately one half of the lens, and more preferably surrounds substantially the entire lens.

Note that, herein, the term "spherical" is intended to refer to surfaces which include both whole spheres and part-spherical surfaces.

The boundary of the transparent material remote from the lens is, in some preferred embodiments of the invention, defined by a substantially spherical surface and in other preferred embodiments the boundary is defined by a substantially planar surface, although any configuration of the boundary can be used if selected to perform a particular optical purpose.

DESCRIPTION OF THE DRAWINGS

In order that the invention may be clearly understood and readily carried into effect, some embodiments thereof will now be described, by way of example only, with reference to the accompanying drawings, of which.

DETAILED DESCRIPTION

Referring now to FIGS. 1 to 4 of the drawings, preferred embodiments of retroreflective devices based on GRIN-sphere lenses are described, by way of example, but it will be appreciated by those skilled in the art that other designs may readily be devised to suit particular objectives.

Figure 1:
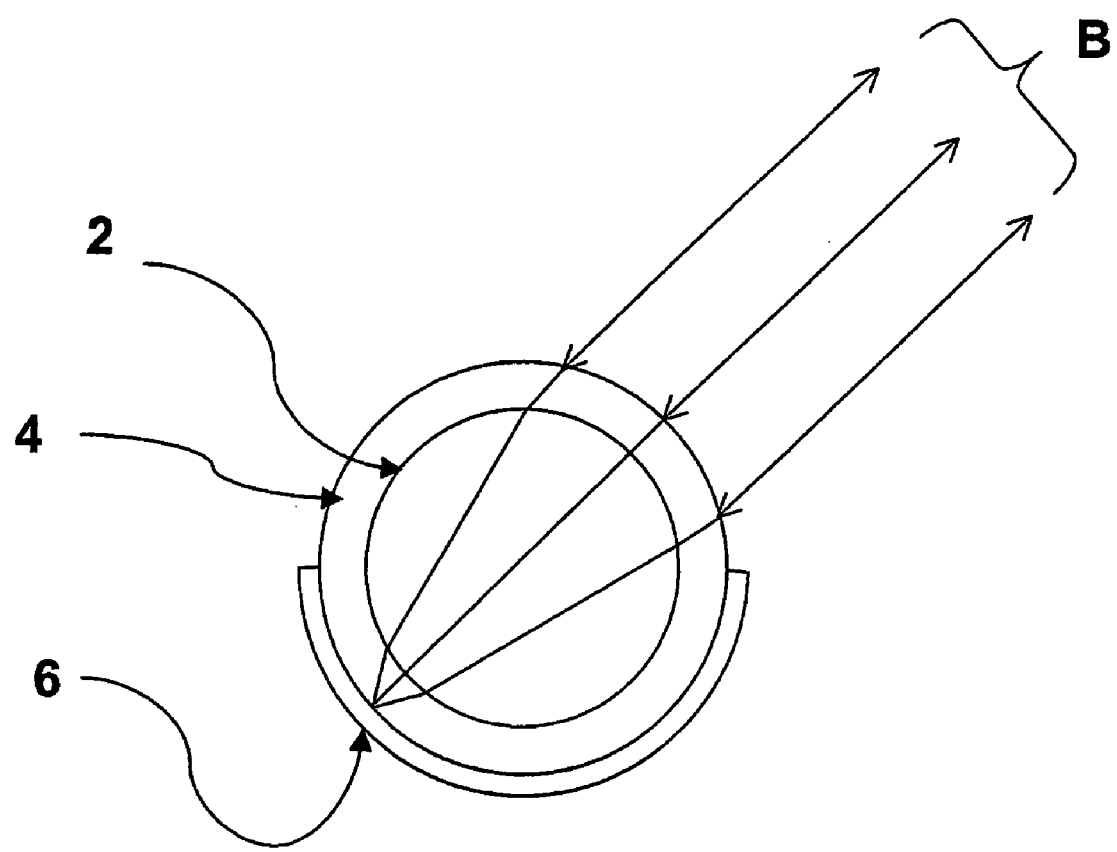
FIG. 1 shows a retroreflective device in accordance with a first embodiment of the invention.

FIG. 1 shows a first embodiment of a retroreflective device based on a GRIN-sphere lens arranged in accordance with the invention. The upper hemisphere of the mechanical surface of the GRIN-sphere lens 2, shown as a solid circle 2, is the surface through which an incident radiation beam B (which is assumed to be a parallel beam) passes into the GRIN-sphere lens.

In order to improve the optical characteristics of the device, the GRIN-sphere lens 2 is clad in, or otherwise coated with, a transparent material 4 having a uniform refractive index of a particular, desired value. The transparent material has a uniform thickness, and has an outer spherical surface which is arranged concentric with the outer surface of the GRIN-sphere lens 2. The upper surface of the transparent material forms the entrance face of the device. Although not shown in FIG. 1, the entrance face of the transparent material 4 (and indeed the equivalent surfaces shown in other figures hereof) may be provided with an anti-reflective coating, applied in any convenient manner.

A reflective coating 6 is applied directly to the outer surface of the transparent material 4, on the side opposite the entrance face, to provide retroreflection of the incident rays 4 as shown. For optimum field of view, the reflective coating 6 covers approximately a hemisphere on the outer surface.

The lens 2 may be made of suitable polymer materials, such as benzyl methacrylate or similar materials, or glass. The desired refractive index distribution may be obtained by any known technique, such as diffusion of suitable materials within the sphere, or photo-inscription in photosensitive material using, for example, ultra-violet sources.

The transparent material 4 may be made of a suitable plastic, for example polymethyl methacrylate, or glass.

The reflective coating 6 may be metallic, for example aluminium, to provide broad spectral reflection, or can itself be of multi-layer design to provide wavelength selective reflection.

Figure 2:
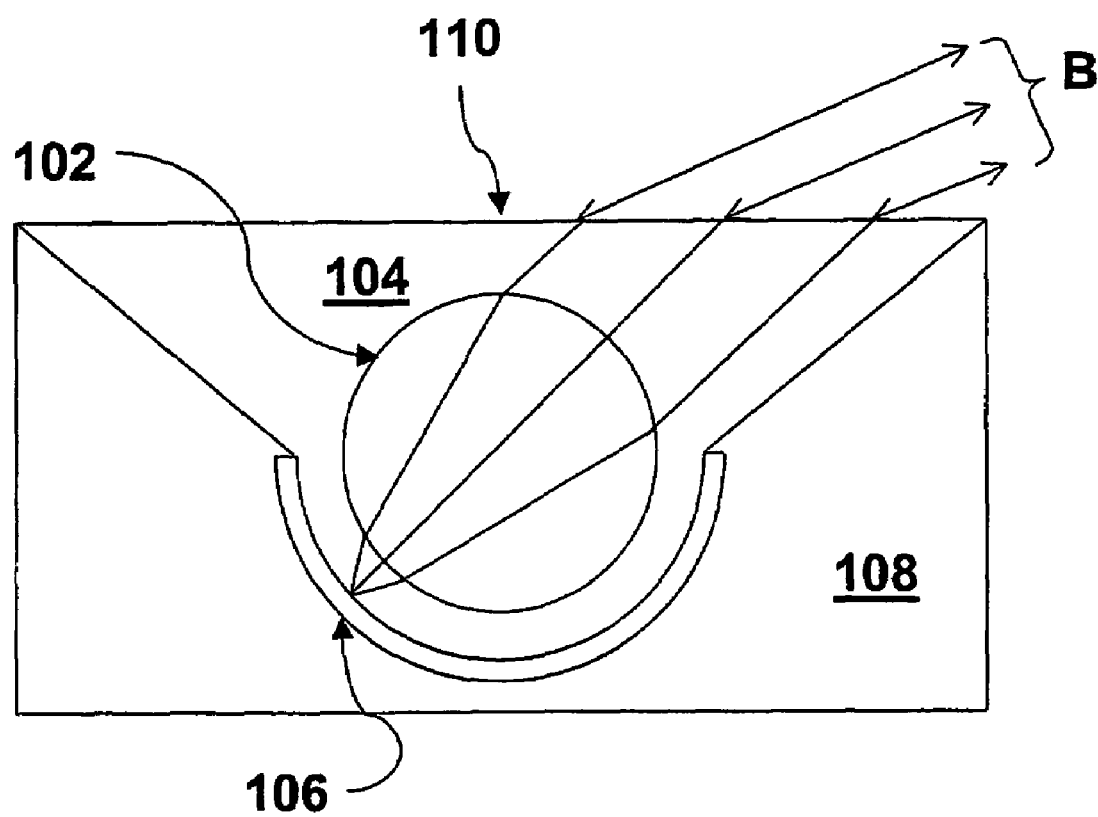
FIG. 2 shows a retroreflective device in accordance with a second embodiment of the invention.

A second embodiment of the invention is shown in FIG. 2. Here, components similar to that shown in FIG. 1 are given the same reference numerals, incremented by 100. The GRIN-sphere lens 102 is immersed in, and may be at least partially supported by, an environment comprising a transparent solid material 104 of uniform refractive index, having a chosen relationship with the refractive index at the GRIN-sphere surface. The transparent material may be supported by a solid structure 108, which may for example have a lower surface formed, for example as a planar surface, so as to stably support the device in a preferred orientation on a horizontal surface. A reflective material 106 is formed on a boundary between the transparent material 104 and the solid structure 108.

Alternatively, depending for example upon the use for which the device is intended and/or the treatment to which it may be subjected, the lens may be immersed in a transparent liquid material and supported by thin filaments (not shown) stretched from the supporting structure 108.

The entrance face 110 of the transparent material 104, forming a boundary of the transparent material remote from the lens 102, and through which a radiation beam passes to be retroreflected, is in this embodiment defined by a substantially planar surface. Such a form of entrance face is relatively easy to manufacture, and does not require precise alignment with respect to the GRIN-sphere lens 202. However, such a form of entrance face suffers from angularly-dependent retroreflectivity and polarisation effects.

Figure 3:
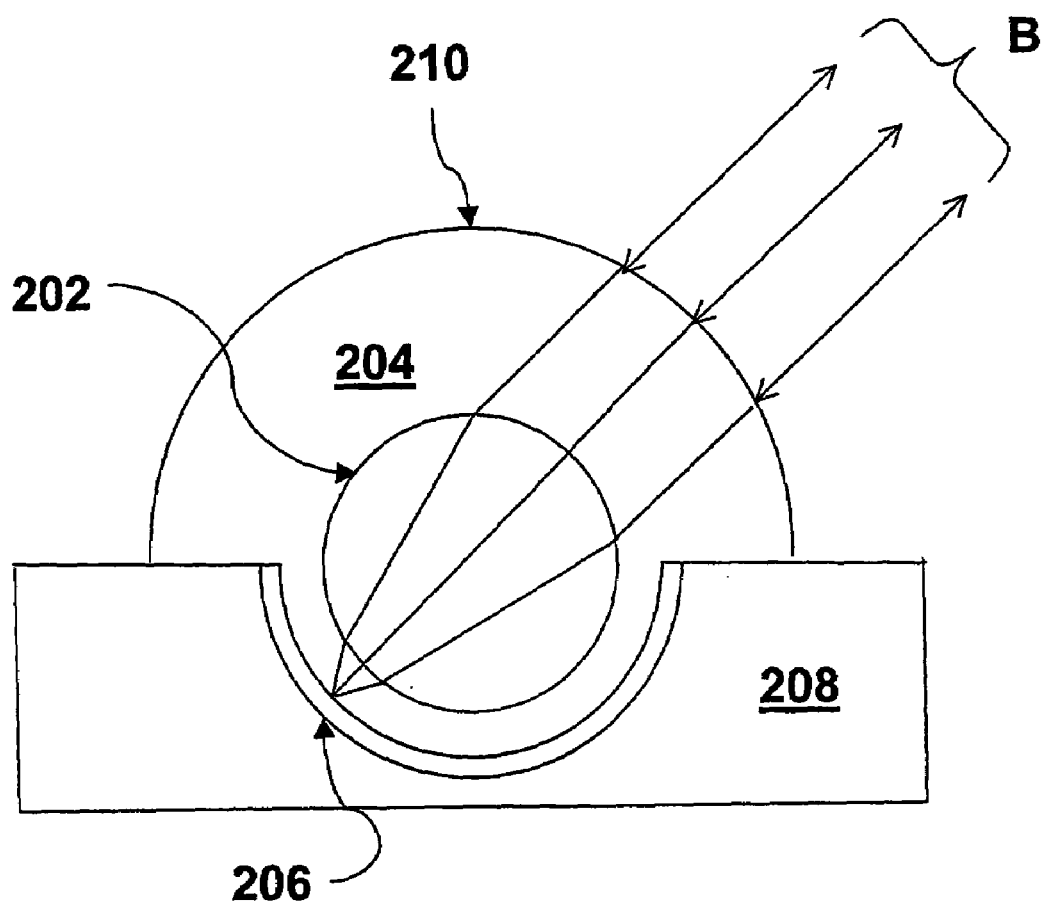
FIG. 3 shows a retroreflective device in accordance with a third embodiment of the invention.

FIG. 3 shows a third embodiment of the invention, which reduces angularly-dependent retroreflectivity and polarisation effects. Here, components similar to those previously described have the same reference numerals, incremented by 100. The transparent material 204 is given a hemispherical outer shape. The material may in this embodiment be protected by a transparent optical dome casing (not shown) made of a relatively hard material, such as glass. This arrangement reduces the variation of reflection performance with incidence angle, compared to the embodiment shown in FIG. 2. The rays encountering the GRIN-sphere can be made effectively paraxial with respect to the lens formed by the outer surface 210, provided that the radius of curvature of the outer surface is made sufficiently large compared to the radius of the outer surface of the GRIN-sphere lens 202. Due to the preferred relatively large radius of curvature of the outer surface of the transparent material 204 at the entrance face 210, the reflective surface of the reflective material 206 has a smaller radius of curvature than that of the entrance face 210.

Figure 4:
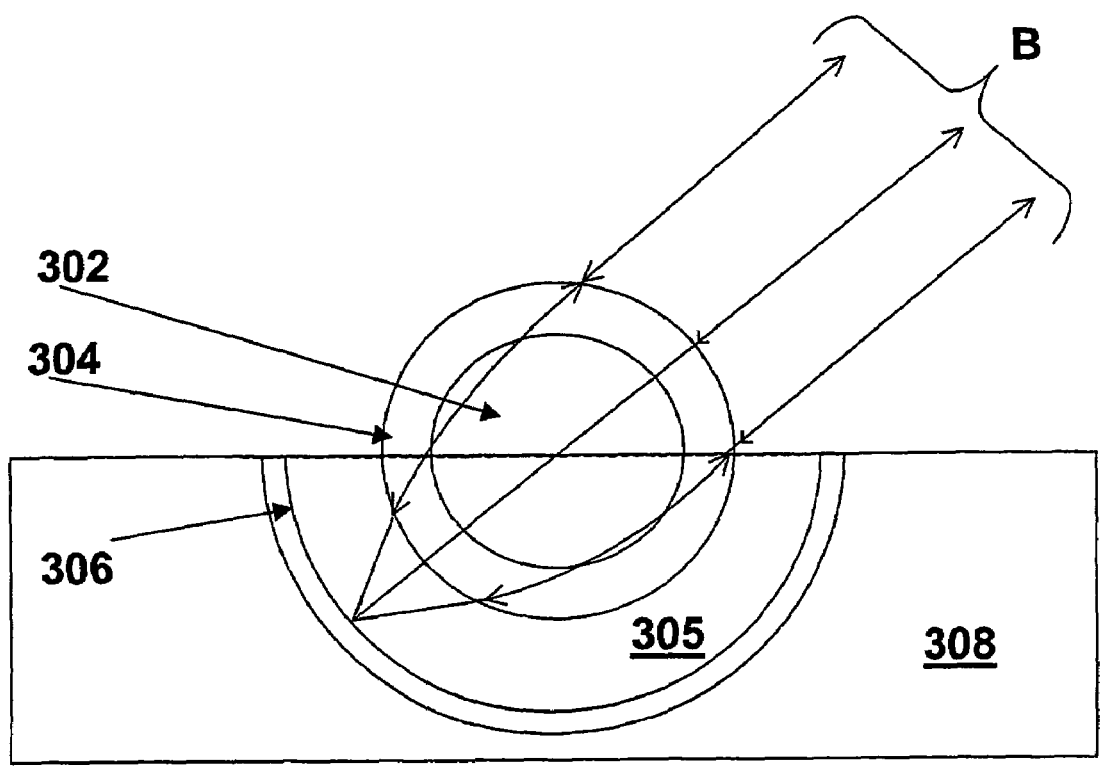
FIG. 4 shows a retroreflective device in accordance with a fourth embodiment of the invention.

FIG. 4 shows a fourth embodiment of the invention. Again, components similar to those previously described have the same reference numerals, incremented by 100. The uniform refractive index cladding 304 has uniform thickness, and a spherical outer surface that is concentric with the outer surface of the GRIN-sphere lens 302, as in the first embodiment. In this embodiment, however, the reflective surface 306 is separated from the cladding material, and there is a space 305 between the outer surface of the cladding 304 and the reflector 306. The size of the space 305 will vary in proportion to the size of the lens. For a lens of outer diameter 20 mm, the gap size is preferably between 7 mm and 10 mm. It is important that the size of the gap is controlled to within a few microns, since the quality of the retroreflection depends on light being focused at the point of reflection. Since the range of refractive indices that it is possible to exploit in GRIN-sphere lenses is limited, this extended focal length allows the useful aperture of the device to be increased. Alternatively, the aperture can be maintained, so that a smaller range of refractive indices is required. This in turn results in there being a wider selection of materials available for use in the GRIN-sphere lens. Space 305 can be filled with any appropriate fluid. For example, to the maximum efficiency, the ratio of the useable lens aperture to the focal length of the device (that determines the size of the device) should be kept large, and so the refractive index of the space 305 needs to be kept as close to unity as possible. It should therefore be filled with dry air, a gas, or vacuum. Typical devices would have an f-number of about 1.5.

Figure 5:
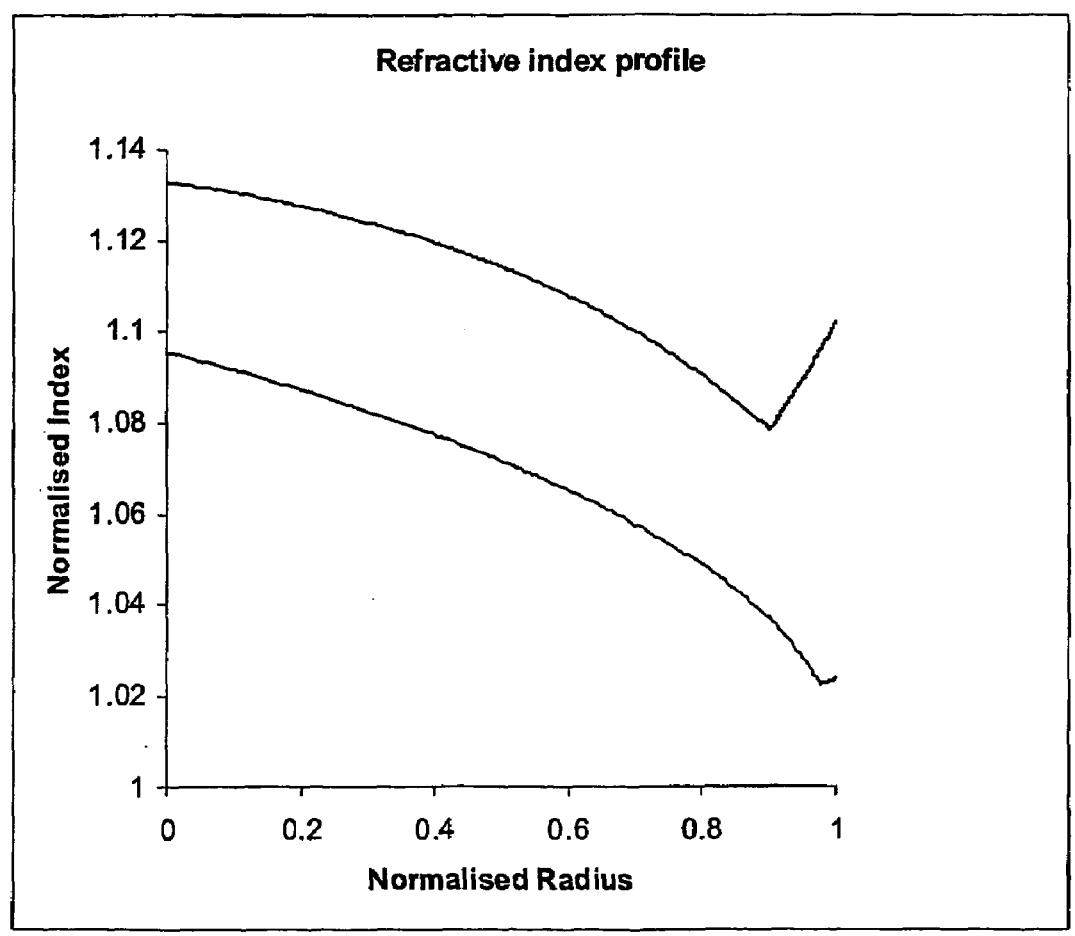
FIG. 5 shows two exemplary refractive index distributions in accordance with embodiments of the invention.

FIG. 5 shows two exemplary refractive index distributions of the GRIN-sphere lens, which may be used in any of the first to third embodiments of the invention.

The distributions are plotted across the entire (normalised) radius of the GRIN-sphere lens, ranging from 0 to 1. The refractive index of the GRIN-sphere lens at each radial point is normalised with respect to the refractive index of the transparent material. In the lower one of the two illustrated distributions, the refractive index ranges from a minimum of approximately 1.02 near the outer surface of the GRIN-sphere lens to approximately 1.10 at the centre of the GRIN sphere lens. In the upper one of the two illustrated distributions, the refractive index ranges from a minimum of approximately 1.08 near the outer surface of the GRIN-sphere lens to approximately 1.14 at the centre of the GRIN sphere lens.

Each of the two exemplary refractive index distributions includes parts having at least two separate radial extents within which the material of the GRIN-sphere lens has a continuously varying refractive index, the refractive index variation having a gradient discontinuity between the two radial extents. The discontinuity is the minimum shown near the outer surface of the lens.

Each of the two exemplary refractive index distributions provides a GRIN-sphere lens having a refractive index at its centre which is greater than a refractive index at its outer surface. Further, it can be seen that the transparent material has a refractive index which is less than a refractive index of GRIN-sphere lens at its outer surface.

Preferably, the ratio of the refractive index of GRIN-sphere lens at its outer surface to the refractive index of the transparent material is between 1 and 2, for example between 1.02 and 1.2. Further preferably, the ratio of the refractive index of GRIN-sphere lens at its centre to the refractive index of the transparent material is between 1 and 2, for example between 1.05 and 1.5.

Typically, in embodiments of the invention, the GRIN-sphere lens has a refractive index distribution which averages, across a radial cross-section, between 1.4 and 1.8, and the transparent material has a refractive index greater than 1.3. As an example, the refractive index may vary between 1.503 and 1.516 for an operational wavelength of 1320 mm.

The transparent material as described in each of the above embodiments is preferably formed, for example as two interfitting halves, by a moulding process. In this manner, the material can be accurately shaped to support the GRIN-sphere lens concentrically with respect to its inner and outer spherical surfaces. Alternative procedures may of course be used depending upon various criteria, such as overall dimensions, performance requirements and operational demands such as robustness.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A retroreflective device comprising a substantially spherical graded refractive index lens, a reflective part for retroreflecting a radiation beam passing through the graded refractive index lens and, at least partially surrounding the lens, a non-gaseous transparent material having a substantially uniform refractive index, wherein said graded refractive index lens has a gradually varying, spherically symmetric, refractive index distribution, and wherein said refractive index distribution includes parts having at least two separate radial extents within which the material of the lens has a continuously varying refractive index, the refractive index variation having a gradient discontinuity between said two radial extents.

2. The device according to claim 1, wherein said graded refractive index lens has a refractive index at its centre which is greater than a refractive index at its outer surface.

3. The device according to claim 1, wherein said transparent material has a refractive index which is less than a refractive index of said graded refractive index lens at its outer surface.

4. The device according to claim 1, wherein a ratio of the refractive index of said graded refractive index lens at its outer surface to a refractive index of said transparent material is between 1:1 and 2:1.

5. The device according to claim 1, wherein a ratio of the refractive index of said graded refractive index lens at its centre to a refractive index of said transparent material is between 1:1 and 2:1.

6. The device according to claim 1, wherein said transparent material surrounds at least approximately one half of the lens.

7. The device according to claim 1, wherein at least part of said transparent material is located between said graded refractive index lens and the reflective part.

8. The device according to claim 1, wherein said reflective part includes a substantially spherical reflective surface arranged concentrically with respect to said graded refractive index lens.

9. The device according to claim 1, having a boundary of the transparent material remote from said lens through which a radiation beam passes to be retroreflected, wherein said boundary is defined by a substantially spherical transparent surface arranged concentrically with respect to the graded refractive index lens, and wherein said reflective part includes a substantially spherical reflective surface arranged concentrically with respect to said graded refractive index lens.

10. The device according to 9, wherein said substantially spherical reflective surface and substantially spherical transparent surface have substantially the same radius of curvature.

11. The device according to claim 9, wherein said substantially spherical reflective surface and substantially spherical transparent surface have different radius of curvature.

12. The device according to claim 11, wherein said substantially spherical reflective surface has a smaller radius of curvature than that of said substantially spherical transparent surface.

13. The device according to claim 1, having a boundary of the transparent material remote from said lens, and through which a radiation beam passes to be retroreflected, wherein said boundary is defined by a substantially planar surface.

14. A device according to claim 1, wherein said transparent material comprises a solid moulded component.

15. A device according to claim 1, wherein said transparent material has a refractive index greater than 1.3.

16. A device according to claim 1, wherein said graded refractive index lens has a refractive index distribution which averages, across a radial cross-section, between 1.4 and 1.8.

* * * * *